(12) United States Patent
Madden et al.

(10) Patent No.: US 8,101,919 B2
(45) Date of Patent: Jan. 24, 2012

(54) ISOTOPIC RESPONSE WITH SMALL SCINTILLATOR BASED GAMMA-RAY SPECTROMETERS

(75) Inventors: Norman W. Madden, Sparks, NV (US); Frederick S. Goulding, Lafayette, CA (US); Stephen J. Asztalos, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 772 days.

(21) Appl. No.: 12/100,254

(22) Filed: Apr. 9, 2008

(65) Prior Publication Data
US 2008/0251728 A1    Oct. 16, 2008

Related U.S. Application Data

(60) Provisional application No. 60/922,940, filed on Apr. 10, 2007.

(51) Int. Cl.
*G01T 1/20* (2006.01)
*G01T 1/00* (2006.01)

(52) U.S. Cl. ..................... 250/367; 250/486.1
(58) Field of Classification Search .............. 250/367, 250/486.1
See application file for complete search history.

(56) References Cited

U.S. PATENT DOCUMENTS

| | | | |
|---|---|---|---|
| 4,841,153 A * | 6/1989 | Wormald | 250/390.04 |
| 5,504,334 A * | 4/1996 | Jansen et al. | 250/369 |
| 5,532,122 A | 7/1996 | Drukier | |
| 6,207,957 B1 | 3/2001 | Kammeraad et al. | |
| 6,727,505 B2 | 4/2004 | Benke et al. | |
| 7,161,150 B2 | 1/2007 | Frankle et al. | |
| 2004/0164250 A1 | 8/2004 | Cork et al. | |
| 2006/0049357 A1 * | 3/2006 | Tumer | 250/363.03 |

OTHER PUBLICATIONS

Goldstein, J. O., et al., "The X-ray/Gamma-ray spectrometer on the near earth asteroid rendevous mission", Space Science Reviews, vol. 82, pp. 169-216, Oct. 1997.
Saint-Gobain Crystals: "Compton Suppressors Detectors for Suppressing Unwanted Background", 2 pgs, 2002.
Saint-Gobain Crystals: "Coincidence/Anti-coincidence Detector applications Information note", 2 pgs, 2004.

* cited by examiner

*Primary Examiner* — David Porta
*Assistant Examiner* — Carolyn Igyarto

(57) ABSTRACT

The intrinsic background of a gamma ray spectrometer is significantly reduced by surrounding the scintillator with a second scintillator. This second (external) scintillator surrounds the first scintillator and has an opening of approximately the same diameter as the smaller central scintillator in the forward direction. The second scintillator is selected to have a higher atomic number, and thus has a larger probability for a Compton scattering interaction than within the inner region. Scattering events that are essentially simultaneous in coincidence to the first and second scintillators, from an electronics perspective, are precluded electronically from the data stream. Thus, only gamma-rays that are wholly contained in the smaller central scintillator are used for analytic purposes.

15 Claims, 2 Drawing Sheets

ISOTOPIC RESPONSE WITH SMALL SCINTILLATOR BASED GAMMA-RAY SPECTROMETERS

This application claims priority to U.S. Provisional Patent Application Ser. No. 60/922,940, titled: "Isotopic Response with Small Scintillator Based Gamma-Ray Spectrometers", filed Apr. 10, 2007, incorporated herein by reference.

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

The present invention relates to detection of gamma-rays, and more specifically, it relates to scintillator based gamma-ray spectrometers.

2. Description of Related Art

Currently, small scintillator-based hand-held or back pack instruments dominate the available gamma-ray detection and identification tools available to the wide community tasked with measuring these emissions. Many parameters, e.g., weight, ease of use, ruggedness, battery life-time, gamma-ray sensitivity, and specificity are addressed by the many vendors of these instruments. Ultimately, cost is traded against performance by the purchasing entity. This generally precludes the semiconductor (germanium) based instruments from almost all applications due to the marked difference in cost (5×+). Most of the commercially available instruments are based on NaI scintillators as they are readily available, moderately efficient, moderately rugged, and can deliver modest spectral resolution at a tolerable cost. The spectral resolution of the NaI based instrument enables some isotope identification. A new small Compton suppressed scintillator instrument having a cost similar to the current instruments but having a much improved response is desired.

The utility of existing forward-deployed hand-held radiation detectors is debatable. Abundant anecdotal evidence suggests their utility is very limited. The reason is clear: low-Z detectors have an extremely low probability for full gamma-ray energy deposition. This intrinsic limitation is compounded by the need to make the fielded detectors as small as possible. A poorly performing radiation detector hampered by false alarms is perhaps worse than no detector at all—it may cause the user to dismiss more practical alternatives. One obvious alternative, replacing the scintillator with a high-resolution germanium crystal, is problematic in at least two areas: germanium is comparatively expensive and the crystal would nonetheless itself need Compton suppression due to size, low atomic number, etc. Rather than make incremental improvements, the present invention makes three improvements that collectively transform these devices into serious perimeter defense stalwarts.

SUMMARY OF THE INVENTION

It is an object of the present invention to provide a small Compton suppressed scintillator instrument with improved signal to noise.

This and other objects will be apparent based on the disclosure herein.

Energetic gamma-rays interact in matter primarily through the multiple Compton processes. Small scintillators, such as those currently used in hand-held instruments to inspect cargo for gamma-ray emitting isotopes, have a large built-in background which significantly degrades their performance. This built-in background arises from the intrinsic inability to contain the incident gamma-ray in the small scintillator volume. The present invention dramatically reduces this intrinsic background by surrounding the scintillator with a second scintillator. This second (external) scintillator surrounds the first scintillator and has an opening of approximately the same diameter as the smaller central scintillator in the forward direction. The second scintillator, possessing a higher atomic number, has a larger probability for a Compton scattering interaction than within the inner region. The shield (outer) scintillator can be made from, e.g., bismuth germanate (BGO). BGO is a very gamma-ray efficient material of limited spectroscopic quality. Since the two scattering events are essentially simultaneous (in coincidence) from an electronics perspective, they would be precluded electronically from the data stream. Thus, only gamma-rays that are wholly contained in the smaller central scintillator would be used for analytic purposes. These wholly contained gamma-rays, while fewer in number, have a much better signal-to-background ratio than even a very much larger (bare) scintillator.

In addition to the above described improvement in signal-to-noise, two other advantages are also achieved. The BGO shield enhances the search mode of operation because of its increased gamma-ray efficiency. Another advantage is that the Compton suppressed central scintillator now acquires a directional response. The directional response allows for the identification of materials from a specific direction only, even when other nearby signals would otherwise dominate an ordinary omni-directional scintillator.

The invention can be used as a high sensitivity scintillator based hand-held gamma-ray spectrometer, e.g., by the Coast Guard, Navy, and U.S. Customs Agents. The invention can be used where instruments based on the use of a Compton suppression shield and a central detector have been used in gamma-ray spectroscopy for both accelerator based physics and astrophysics. Further uses include first responders, IAEA Inspectors, Customs and Border Patrol personnel etc.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The present invention improves upon existing detectors in three ways: replace the low-Z NaI(Tl) scintillator with a high-Z CsI(Na) scintillator, surround the latter with another high-Z Compton suppression shield and replace phototubes with high-quantum efficiency avalanche or PIN diodes.

Compton-suppression is a technique commonly employed in gamma-ray spectroscopy in low-energy nuclear physics applications where the Compton cross section typically greatly exceeds the photoelectric cross section. Compton suppression is typically achieved by surrounding a material that has excellent intrinsic resolution, but poor absorption characteristics, with a concentric material having a relatively larger interaction probability. In this manner, photons that interact in both regions are electronically eliminated in favor of those (few) that deposit all of their energy within the inner volume. In doing so, the peak-to-total ratio, that is, the ratio of photons within the total energy peak to that distributed throughout the entire spectrum is greatly improved, with a concomitant improvement in the ability to identify the isotope responsible for emitting the photon. This technique is indispensable in situations where many different gamma-ray emitters are produced and isotopic identification is desired. Though much less common, an analogous technique can be employed in situations where the inner region has poorer spectral resolution albeit with the same dividend: a greatly improved peak-to-total ratio. Inorganic crystal scintillators are but one example, where their relatively high atomic number results in greater stopping powers. Sodium iodide is an inorganic scintillator common in many nuclear physics applications due to its high light output. Nevertheless, in applications where portability is a paramount, it is important to remember that the absorption length for a 1 MeV photon is nearly one meter, whereas the typical detector length is 7 cm. While the interaction length is considerably smaller, the impartial energy deposition dominates and contributes entirely to background. By surrounding this scintillator with another scintillator having a high atomic number and rejecting events where interactions occur in both regions, a dramatic improvement is possible. Simulations have been performed of a NaI scintillator surrounded by BGO with the result virtually background free.

The basic configuration of the radiation detecting elements of the invention comprises a central scintillation gamma ray detector surrounded by a unique Compton suppression shield (typically, but not necessarily, made from a high density scintillator), a photo detector and companion electronics to collect and process the signal in the central scintillator, and photo detectors to detect gamma radiation striking the Compton suppression shield.

Figure 2:
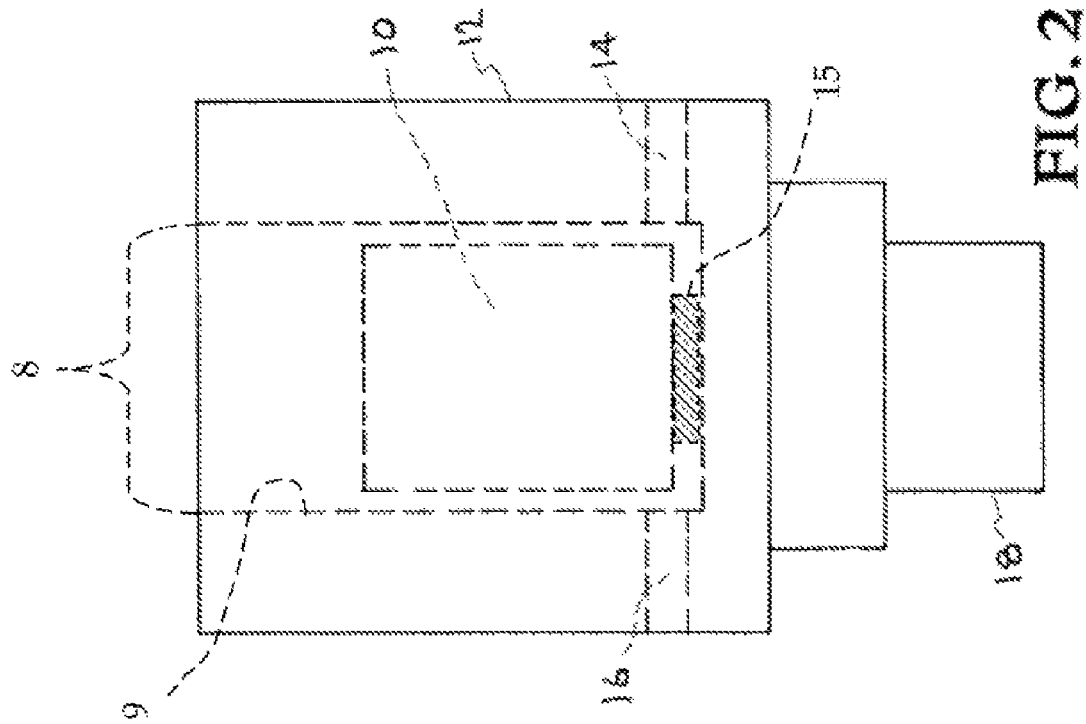
FIG. 2 is a side view of the embodiment of FIG. 1.
Figure 1:
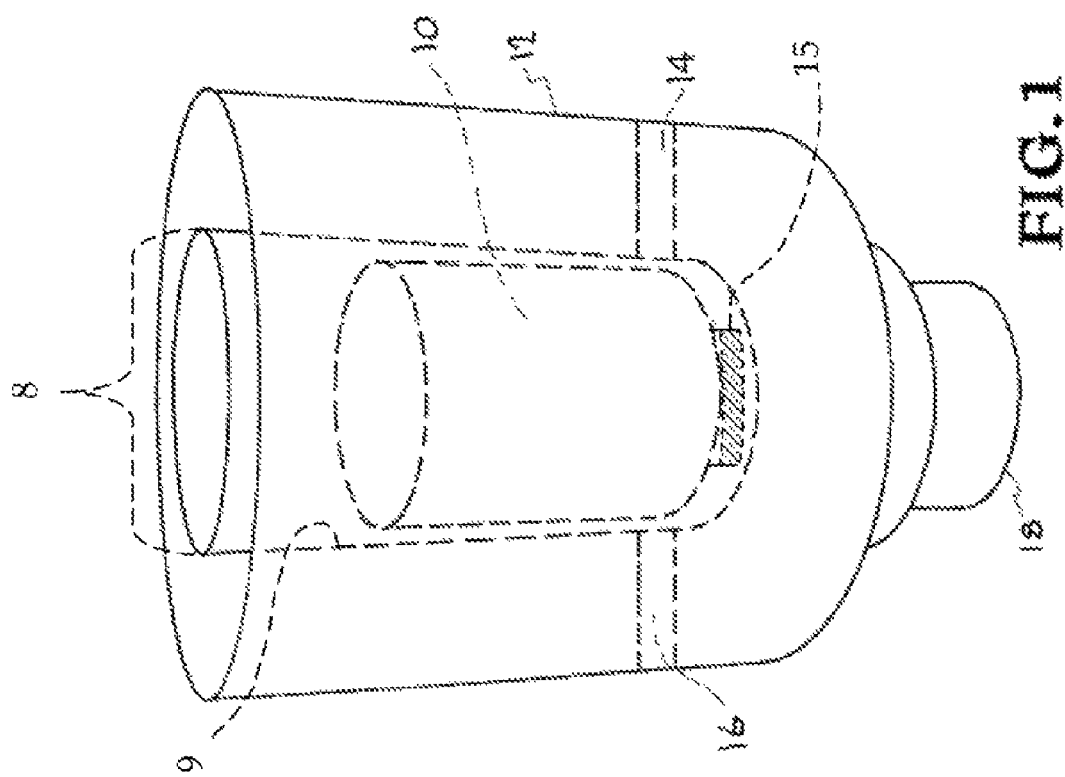
FIG. 1 shows an oblique view of an embodiment that includes a first scintillator located within a single piece cup shaped second scintillator (shield).

The geometry of the Compton suppression shield can take several forms, all of which serve to intercept and respond to radiation entering or exiting the central detector from a direction other than the forward observing direction. The optimum geometry is that of a cup-shaped well, or cylinder with a closed bottom. An aperture 8, shown in FIGS. 1 and 2, is formed by the open end of well 9. Other shield shapes include square or other shaped enclosures with a cylindrical or other shaped opening on top and a closed bottom. A cylindrical annulus with an opening at the bottom is the historic and therefore common geometry for a Compton suppression shield. The open bottom accommodates the photo detector, typically a PMT, but has the limitation that it does not respond to gamma radiation exiting the bottom of the volume enclosed by the shield. As the overall instrument dimensions are made smaller, such as a handheld instrument, this hole in the bottom of conventional Compton suppression shields becomes a dominant flaw. While Compton scattering of gamma-rays occurs at many different angles but the preferential direction is forward making the bottom of the shield the most important region for Compton suppression. The cup-shaped shield must accommodate and hold a central scintillator detector while minimizing the gap between shield and detector as well as the amount of any additional material required to mount, affix or otherwise hold the assembly together. The assembly should have a mechanical gap between the back face of the central detector and the bottom of the shield for the photo detector and required electronics. The mass of the non-detector materials such as the associated electronics should be minimized so as not to impede the passage of gamma radiation from the central detector into the Compton suppression shield. Accordingly, thin silicon photo diodes or avalanche photo diodes 15, as shown in FIGS. 1 and 2, mounted directly to the bottom of the central scintillator are necessary for this application. Photo multiplier tubes are currently too bulky and would introduce large amounts of gamma-ray absorbing materials between the bottom of the central detector and the Compton suppression shield. The Compton suppression shield can have one or more small access ports located at the bottom of the well through which to pass power and signal wires for the central detector electronics. In addition the well may be formed by assembling, by means of bonding adhesive or an exterior housing, two or more sections such that the combination reproduces the cup-shaped geometry described above. In the case that the sections are optically isolated from one another, provision must be made for detecting gamma radiation in each section. This case of optically isolated shield sections, independently and simultaneously monitored, offers the ability to determine, through analysis of the relative response of all shield sections, the vector direction of maximum radiation and thereby give the end user an indication of incident radiation without the need to rotate or otherwise manipulate the device.

The Compton suppression shield can be fabricated from any material combination that intercepts and detects gamma radiation passing into or through it. A semiconductor detector such as Germanium or Cadmium Zinc Telluride could theoretically be assembled to function as Compton suppression shield, although these materials are not practical for this purpose. Typically scintillation based detectors are appropriate for fabricating Compton suppression shields. A shield therefore usually comprises a scintillator coupled to a photo detector and enclosed in a light tight housing. The preferred scintillation material for the shield has a high gamma-ray capture cross section and a high energy-to-light conversion efficiency. Bismuth Ortho-Germanate (BGO) is a commonly used scintillator material that meets these criteria. Numerous other scintillating materials that convert high energy radiation into light (infrared, visible, or UV wavelength) and can transmit the generated light through the material (translucent) can be used to fabricate a Compton suppression shield in the context of the invention. These include, but are not limited to, Thallium-doped Sodium Iodide and Cesium-Iodide, Barium Fluoride and Calcium Fluoride, Lithium-doped glass, translucent ceramics, Plexi-glass, Cerium-doped Lanthanum Chlorides. BGO is a superior material for application in the shield because it is both an efficient gamma ray absorber and energy-to-converter and is relatively inexpensive. BGO's high absorption efficiency allows for a shield geometry with minimal wall thickness and therefore minimum overall dimensions. The high energy-to-light conversion efficiency makes possible the use of a compact light detection device such as a photomultiplier tube (PMT), avalanche photodiode (APD), or PIN-junction photodiode to detect incident gamma rays. A cup-shaped shield composed of BGO should have a wall thickness of at least 1 cm and preferably larger in order to intercept a large fraction (~99%) of incident gamma radiation up to energies of 3 MeV. The well in the Compton suppression scintillator typically will have dimensions able accommodate a central scintillation detector of useful size, at least 2 cm across and 2 cm deep.

The central core detector in this invention is a scintillator coupled to a photo detector ideally enclosed in a light tight housing and combined with associated pulse amplification and processing electronics to enable gamma-ray energy spectroscopy. The desired features of the central scintillator detector are good energy resolution and good gamma radiation capture efficiency. Numerous scintillating materials that convert high energy radiation into light (infrared, visible, or UV wavelength) and can transmit the generated light through the material (translucent) can be used to fabricate the central core detector in the context of the invention, including the scintillator materials described above. The primary considerations for the choice of scintillation material for the central detector, in addition to capture and conversion efficiency ("brightness") and energy resolution, are cost, mechanical robustness, and chemical inertness (hygroscopic properties). Tri-halide scintillators, such as Lanthanum tri-bromide currently offer the best energy resolution but are very expensive and are mechanically and chemically fragile. Thallium doped Cesium-Iodide (CsI(Tl)) scintillators are inexpensive, robust, and exhibit a resolution that is better than Sodium Iodide (NaI), the most commonly used scintillator for gamma-ray spectroscopy. In addition, the wavelength of light emitted by CsI(Tl) is much better suited for silicon PIN or Avalanche photo diodes than that produced in NaI detectors. The central scintillator detector geometry, shape, and size of can be of any form that will fit entirely within the well of Compton suppression shield. In the preferred embodiment a CsI(Tl) detector in the form of a right cylinder with a diameter of at least 2 cm and a height of at least 2 cm meets this requirement.

Figure 4:
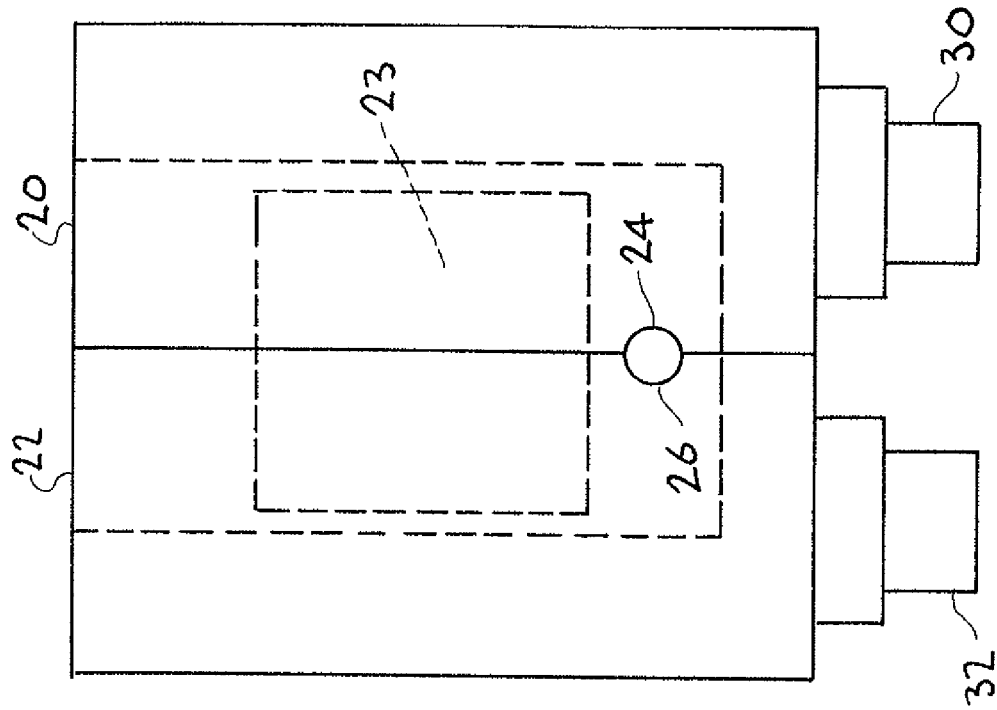
FIG. 4 is a side view of the embodiment of FIG. 3 and further includes a detector or detector mount dedicated to each side of the split shield.
Figure 3:
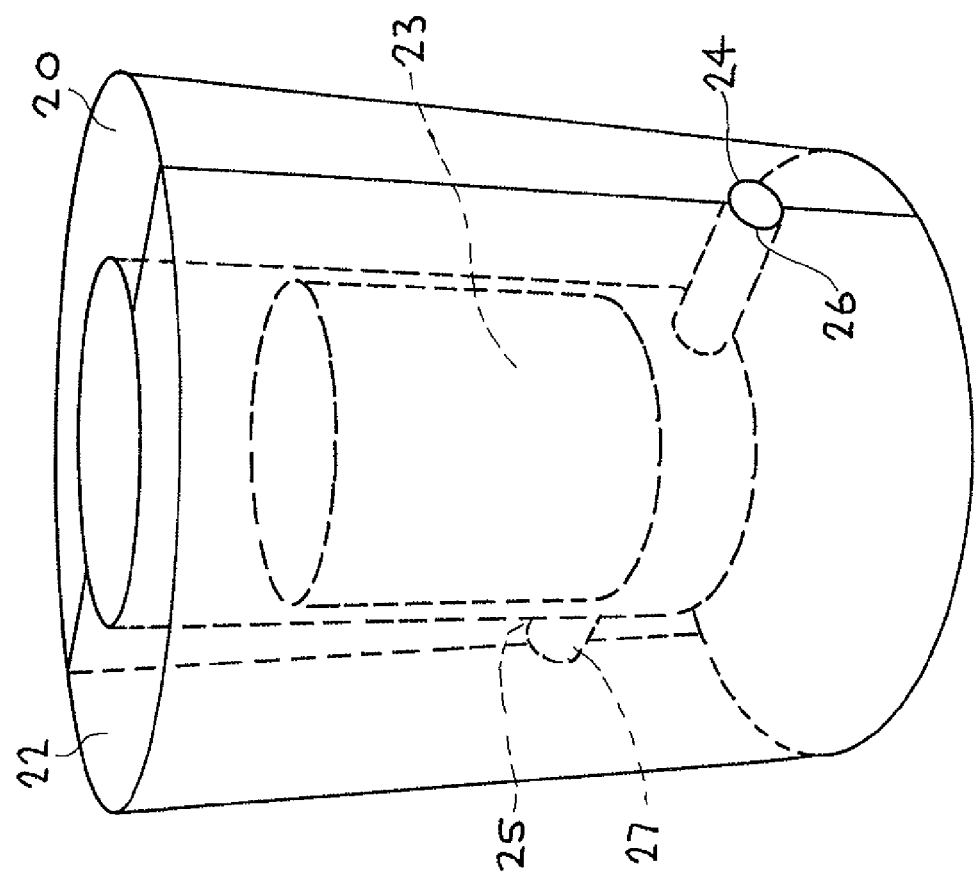
FIG. 3 shows an oblique view of a split shield that includes two half-shield sections.

As discussed above, a variety of configurations of the shield are usable. FIGS. 1-4 show exemplary embodiments. Other embodiments will be apparent to those skilled in the art based on this disclosure. FIG. 1 shows an oblique view of an embodiment that includes a first scintillator 10 located within a single piece cup shaped second scintillator (shield) 12. Holes 14 and 16 are provided for electrical connections to a photo detector (not-shown) that can be located in a space between the bottom of the first scintillator and the cup bottom. A detector 18 or detector housing is attached to the external bottom of the shield 12. FIG. 2 is a side view of the embodiment of FIG. 1. FIG. 3 shows an oblique view of a split shield that includes a half-shield section 20 and another half-shield section 22. A first or inner scintillator 23 is located within the cup formed by the two sections. This embodiment is fabricated so that each half section includes a cutaway section for electrical connections. Thus, half-shield section 20 includes electrical connection sections 24 and 25. Half-shield section 22 likewise includes electrical connection sections 26 and 27. FIG. 4 is a side view of the embodiment of FIG. 3 and further includes a detector or detector mount dedicated to each side of the split shield. Thus, half-shield section 20 includes detector 30 (or a detector mount) and half-shield section 22 likewise include detector 32 (or a detector mount).

Exemplary embodiments have been described in detail. Other embodiments will be apparent to those skilled in the art based on the exemplary embodiments described herein. One embodiment described is a gamma ray spectrometer, comprising a first scintillator having a first aperture; a first photo detector operatively aligned to detect at least a portion of a first set of particle produced light produced in said first scintillator, wherein said first photo detector will produce a first data stream from said at least a portion of said light; a second scintillator surrounding said first scintillator and having a second aperture in substantially the same direction as said first aperture, wherein said first aperture and said second aperture are about the same size, wherein said second scintillator comprises a higher atomic number than said first scintillator; a second photo detector operatively aligned to detect at least a portion of a second set of particle produced light produced in said second scintillator; and means for eliminating dual data from said data stream to produce a final data stream, wherein said dual data is produced in both said first scintillator and said second scintillator. The means for eliminating dual data does not eliminate gamma-ray interactions that are wholly contained in said first scintillator. The second scintillator may comprise bismuth germanate (BGO). The first scintillator may comprise CsI(Na). The second scintillator may comprise a cup-shaped well. It may comprise a cylinder with a closed bottom. It may comprise a closed bottom. It may comprise one or more small access ports that do not exit the back of said second scintillator. The second scintillator may comprise a plurality of sections, in which case, it may further comprise at least one added detector, wherein said second photo detector is operatively aligned to one section of said plurality of sections and wherein each detector of said at least one added detector is aligned to a remaining unique section of said plurality of sections, wherein each section of said plurality of sections comprises its own dedicated photo detector. The first photo detector can be selected from the group consisting of an avalanche diode and a PIN diode. The second photo detector can selected from the group consisting of an avalanche diode and a PIN diode. The spectrometer may further comprise a light tight housing that encloses said first scintillator, said first photo detector, said second scintillator and said second photo detector. The second scintillator may comprise a material selected from the group consisting of thallium-doped sodium iodide, thallium-doped cesium-iodide, barium fluoride, calcium fluoride, lithium-doped glass, a translucent ceramic, cerium-doped lanthanum chloride and Poly(methyl methacrylate). At least one of said first photo detector and said second photo detector may be selected from the group consisting of a photomultiplier tube, an avalanche photodiode and a PIN-junction photodiode. The means for eliminating data comprises Compton suppression. The first set of particle produced light is generated in said first scintillator by at least one gamma ray particle. The second set of particle produced light is generated in said second scintillator by at least one gamma ray particle. The invention contemplates methods of gamma ray spectroscopy or spectrometry that use the above described spectrometer embodiments. The Compton suppression may be performed in electrical hardware configurations and may alternately include computer hardware and software elements.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:
1. A gamma ray spectrometer, comprising:
a first scintillator having a first forward facing side, a first rear facing side and a first central portion that extends from said first forward facing side to said first rear facing side;
a second scintillator having a higher atomic number than said first scintillator and having a second forward facing side, a second rear facing side and a second central portion, that extends from said second forward facing side to said second rear facing side;

wherein said second scintillator further comprises an aperture in said second forward facing side and a well extending into said second central portion from said aperture;

wherein said well comprises a well bottom;

wherein said first scintillator is located within said well;

wherein said first forward facing side and said second forward facing side are facing the same direction;

a photodiode fixed within said well and located between said first rear facing side and said well bottom; and a photo detector operatively aligned toward said well bottom and on the opposite side of said well bottom than said photodiode, wherein said photo detector is aligned to detect at least a portion of a first set of particle produced light produced in said second scintillator.

2. The spectrometer of claim 1, wherein said second scintillator comprises bismuth germanate (BGO).

3. The spectrometer of claim 1, wherein said first scintillator comprises CsI(Na).

4. The spectrometer of claim 1, wherein said well is cup-shaped.

5. The spectrometer of claim 1, wherein said second scintillator comprises a cylinder with a closed bottom.

6. The spectrometer of claim 1, wherein said second scintillator comprises a closed bottom.

7. The spectrometer of claim 1, wherein said second scintillator comprises one or more small access ports that do not exit said second rear facing side.

8. The spectrometer of claim 1, wherein said second scintillator comprises a plurality of sections.

9. The spectrometer of claim 8, further comprising at least one added photo detector, said photo detector is operatively aligned to one section of said plurality of sections and wherein each detector of said at least one added photo detector is aligned to a remaining unique section of said plurality of sections, wherein each section of said plurality of sections is aligned with its own dedicated photo detector.

10. The spectrometer of claim 1, wherein said photodiode is selected from the group consisting of an avalanche diode and a PIN diode.

11. The spectrometer of claim 1, wherein said photo detector is selected from the group consisting of an avalanche diode and a PIN diode.

12. The spectrometer of claim 1, further comprising a light tight housing that encloses said first scintillator, said photodiode, said second scintillator and said photo detector.

13. The spectrometer of claim 1, wherein said second scintillator comprises a material selected from the group consisting of thallium-doped sodium iodide, thallium-doped cesium-iodide, barium fluoride, calcium fluoride, lithium-doped glass, a translucent ceramic, cerium-doped lanthanum chloride and Poly(methyl methacrylate).

14. The spectrometer of claim 1, wherein a second set of particle produced light is generated in said first scintillator by at least one gamma ray particle.

15. The spectrometer of claim 1, wherein said first set of particle produced light is generated in said second scintillator by at least one gamma ray particle.

* * * * *